(12) United States Patent
Gunji

(10) Patent No.: US 10,739,249 B1
(45) Date of Patent: Aug. 11, 2020

(54) FLOW CELL

(71) Applicant: Shimadzu Corporation, Kyoto (JP)

(72) Inventor: Masahide Gunji, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 16/184,515

(22) Filed: Feb. 4, 2019

(51) Int. Cl.
*G01N 21/01* (2006.01)
*G01N 21/25* (2006.01)
*G01N 21/27* (2006.01)

(52) U.S. Cl.
CPC .......... *G01N 21/01* (2013.01); *G01N 21/255* (2013.01); *G01N 21/27* (2013.01)

(58) Field of Classification Search
CPC ........ G01N 21/05; G01N 21/01; G01N 21/27; G01N 21/255; G01N 21/0332; G01N 21/33; G01N 21/3504; G01N 2021/058; G01N 2021/0346; G01N 30/74; G01N 30/30
See application file for complete search history.

(56) References Cited

U.S. PATENT DOCUMENTS

| | | | | |
|---|---|---|---|---|
| 4,509,856 A | * | 4/1985 | Lee | G01N 21/07 250/461.1 |
| 4,588,893 A | * | 5/1986 | Vidrine | G01N 21/05 250/343 |
| 4,643,570 A | * | 2/1987 | Machler | G01N 21/05 250/576 |
| 5,747,349 A | * | 5/1998 | van den Engh | G01N 21/6428 356/246 |
| 5,757,482 A | * | 5/1998 | Fuchs | G01N 21/05 356/246 |
| 6,188,474 B1 | * | 2/2001 | Dussault | G01N 21/0303 356/246 |
| 6,198,530 B1 | * | 3/2001 | Leyderman | B29C 35/0888 356/244 |
| 6,600,558 B2 | * | 7/2003 | Ueno | G01N 21/0332 356/244 |

(Continued)

FOREIGN PATENT DOCUMENTS

| | | |
|---|---|---|
| JP | H07-063678 A | 3/1995 |
| JP | H11-201896 A | 7/1999 |

(Continued)

OTHER PUBLICATIONS

Notice of Reasons for Refusal for corresponding Japanese Patent Application No. JP 2016-092960, dated Jul. 16, 2019.

*Primary Examiner* — Sang H Nguyen
(74) *Attorney, Agent, or Firm* — Muir Patent Law, PLLC

(57) ABSTRACT

The flow cell is composed of a cell block and a cell holder. The cell block is light transmittable and is provided with a plurality of cells communicated with each other and mutually different in optical path length and an inlet and an outlet communicated with the cell. The plurality of cells include a short optical path length cell having an optical path length of 100 μm or less. The short optical path length cell is constituted by a groove formed on an inner joining surface of a plurality of laminated light transmitting substrates. The optical path length of the short optical path length cell is defined by a depth of the groove. The cell holder is configured to accommodate the cell block therein, and is provided with an incident window for allowing light to enter the cell block and an emission window for emitting the light transmitted through the cell block.

6 Claims, 4 Drawing Sheets

(56) References Cited

U.S. PATENT DOCUMENTS

| | | | |
|---|---|---|---|
| 7,204,139 B2* | 4/2007 | Takayama | B01F 5/0646 |
| | | | 73/204.26 |
| 7,670,559 B2* | 3/2010 | Chien | B01L 3/502715 |
| | | | 422/504 |
| 8,064,063 B2* | 11/2011 | Naessens | G01N 21/05 |
| | | | 356/436 |
| 8,647,590 B2* | 2/2014 | Brennen | B01L 3/502707 |
| | | | 422/503 |
| 2014/0373606 A1* | 12/2014 | Kraiczek | G01N 33/54373 |
| | | | 73/61.55 |
| 2015/0276588 A1 | 10/2015 | Marshall et al. | |

FOREIGN PATENT DOCUMENTS

| | | |
|---|---|---|
| JP | 2002-243632 A | 8/2002 |
| JP | 4315596 B2 | 8/2009 |
| JP | 2014-055784 A | 3/2014 |

\* cited by examiner

FLOW CELL

TECHNICAL FIELD

The present invention relates to a flow cell used for, e.g., an absorptiometric detector of a liquid chromatograph.

BACKGROUND ART

As a detector of a liquid chromatograph, an absorptiometric detector is known. The absorptiometric detector is provided with a flow cell having a flow path (cell) that allows a sample solution eluted from a separation column to pass through (see Patent Document 1). The absorptiometric detector quantifies a sample component concentration in a sample solution flowing through a cell by irradiating light of a predetermined wavelength region from a light source against a flow cell, measuring the intensity of the light transmitted through the flow cell with a light detector, and obtaining the absorbance at a given wavelength region.

PRIOR ART

Patent Document

Patent Document 1: Japanese Unexamined Patent Application Publication No. 2014-055784
Patent Document 2: Japanese Unexamined Patent Application Publication No. 2002-243632

SUMMARY OF THE INVENTION

Problems to be Solved by the Invention

In general, a flow cell used for such an absorptiometric detector is configured to transmit light through a sample solution flowing through the cell in parallel to the flow direction of the sample solution. The optical path length of the light that transmits through the cell is determined by the size of the entire cell body, and the optical path length is generally about 5 to 10 mm. However, in cases where the concentration of the sample component contained in the sample solution is high, since the optical path length of the light that transmits through the cell is long, almost all the incident light is absorbed by the sample. As a result, the transmitted light cannot be detected, and therefore it is impossible to perform an adequate absorbance measurement. For this reason, in such a case, it was necessary to dilute the sample or replace the flow cell with a flow cell having a shorter optical path length.

When the sample is high in concentration, it may be sometimes necessary to dilute about 100 times to 1000 times. In order to perform the measurement without diluting the sample as described above, a flow cell having an optical path length of 100 μm or less will be required. Conventionally, there exists no flow cell having such a very short optical path length, and it was not easy to produce such a flow cell having such a short optical path length.

Under the circumstances, it is an object of the present invention to provide a flow cell provided with a cell having an optical path length of 100 μm or less and capable of changing the optical path length of the cell according to a concentration of a sample.

Means for Solving the Problems

The flow cell according to the present invention is provided with a cell block and a cell holder. The cell block is light transmittable, and is provided with a plurality of cells communicated with each other and mutually different in optical path length and an inlet and an outlet communicated with the cells and formed on a surface of the cell block. The plurality of cells includes a short optical path length cell having an optical path length of 100 μm or less. The short optical path length cell is constituted by a groove formed on an inner joining surface of a plurality of laminated light transmitting substrates. The optical path length of the short optical path length cell is defined by a depth of the groove. The cell holder is configured to accommodate the cell block therein, and is provided with an incident window for allowing light to enter the cell block and an emission window for emitting the light transmitted through the cell block.

The plurality of cells of the cell block may include a long optical path length cell configured by a through-hole provided in an intermediate substrate sandwiched between the plurality of light transmitting substrates. By configuring as described above, in addition to a short optical path length cell having an optical path length of 100 μm or less, a long optical path length cell having an optical path length corresponding to the thickness of the intermediate substrate is provided. Therefore, the selection range of the cell optical path length according to the concentration of the sample can be increased. As a result, the dynamic range of the detector can be widened.

The optical path length of the long optical path length cell is, for example, 1 mm or more.

In a preferred embodiment of the flow cell according to the present invention, the cell holder is provided with a fixed block provided with an incident window and fixed in position and a movable block configured to hold the cell block and provided with the emission window, the movable block being fixed to the fixed block in a state in which the cell block is positioned with respect to the incident window so that a desired cell is arranged on an optical axis of the incident light from the incident window. Since it is possible to place a cell having a desired optical path length on the optical axis of the incident light from the incident window by changing the fixed position of the movable block with respect to the fixed block, it is easy to change the optical path length of the cell.

In the above-described embodiment, it is preferably provided with an engagement structure for defining a relative position between the fixed block and the movable block for placing a desired cell on the optical axis of the incident light from the incident window on mutual abutting surfaces of the fixed block and the movable block. With this, it becomes easy to position the cell block with respect to the incident window.

The movable block is preferably provided with a flow path therein communicated with the inlet and the outlet of the cell block. With this, it is easy to connect the flow path to the inlet and the outlet in the cell block.

A method of producing a flow cell according to the present invention includes: an etching step of forming a groove having a depth of 100 μm or less by an etching technique on one surface of a light transmitting substrate; an inlet/outlet forming step of forming a hole communicated with both ends of the groove in the light transmitting substrate; and a joining step of joining the first light transmitting substrate and the second light transmitting substrate so that the groove constitutes a cell after the etching step and the inlet/outlet forming step.

Effects of the Invention

In the flow cell according to the present invention, a short optical path length cell having an optical path length of 100

μm or less is provided in the cell block, wherein the short optical path length cell is formed of a groove provided on the inner joining surface of the plurality of laminated light transmitting substrates and the optical path length is defined by the depth of the groove. Therefore, even for a high concentration sample that cannot be measured with a conventional flow cell unless it is diluted, the measurement can be performed without dilution. Furthermore, since a plurality of cells mutually communicated with each other and different in optical path length with each other are provided inside the cell block, it is possible to change the optical path length of the cell according to the concentration of the sample without exchanging the flow cell.

Note that a flow cell having a plurality of cells different in optical path length is disclosed in Patent Document 2 (Japanese Unexamined Patent Application Publication No. 2002-243632). However, the cell of the flow cell disclosed therein has optical path lengths of 1 mm and 10 mm, and does not have an optical path length of 100 μm or less. The conventional flow cell as disclosed in Patent Document 2 is not constituted by laminated substrates, and the flow cell is not constituted by a groove formed by an etching technique. On the other hand, it is difficult to realize a cell having an optical path length of 100 μm or less by a method other than an etching technique. For this reason, in the flow cell disclosed in Patent Document 2, it is difficult to realize a cell having an optical path length of 100 μm or less. Therefore, in a conventional flow cell, no consideration is given to a high concentration sample that requires a cell having an optical path length of 100 μm or less.

On the other hand, in the present invention, a short optical path length cell of the flow cell is realized by a fine groove of 100 μm or less formed by an etching technology. By using an etching technique for the substrate surface, fine groove processing can be easily performed, so that a fine cell of 100 μm or less can be easily formed with high accuracy.

In the method of producing a flow cell according to the present invention, since a groove having a depth of 100 μm or less is formed on one surface of a light transmitting substrate by an etching technique and a plurality of light transmitting substrates is joined so that the groove constitutes a cell, it is possible to easily form a fine cell of 100 μm or less with high accuracy.

EMBODIMENTS FOR CARRYING OUT THE INVENTION

Hereinafter, one embodiment of a flow cell will be described below with reference to the drawings.

Figure 1:
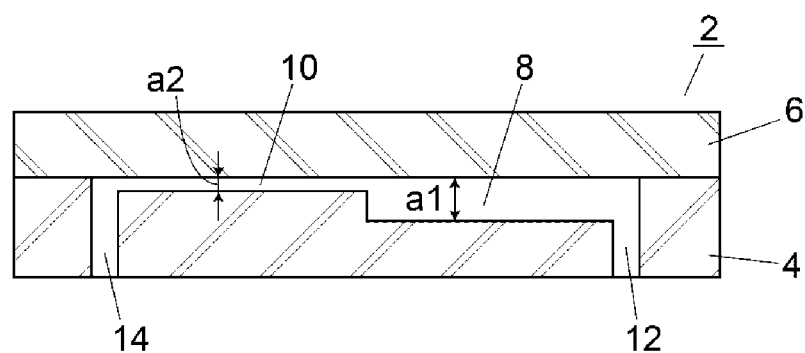
FIG. 1 is a cross-sectional view showing a cell block in a flow cell of one embodiment.

First, a cell block 2 in the flow cell of this embodiment will be described with reference to FIG. 1.

The cell block 2 used for the flow cell of this embodiment is constituted by joining quartz substrates 4 and 6 which are two light transmitting substrates. In the cell block 2, a cell 8 and a cell 10 continuously communicated with the cell 8 are provided. On a surface of the substrate 4 opposite to the inner joining surface thereof, an inlet 12 communicated with the end of the cell 8 and an outlet 14 communicated with the end of the cell 10 are provided. A sample flows into the cell block 2 from the inlet 12, flows through the cell 8 and the cell 10 in order, and then flows out from the outlet 14 to the outside of the cell block 2.

In the following description, of the main surfaces of the cell block 2, the surface on the side where the inlet 12 and the outlet 14 are provided is denoted as a "front surface", and the surface on the opposite side thereof is denotes as a "rear surface".

The cell block 2 is used so that light travels in a direction perpendicular to the front surface and the rear surface of the substrates 4 and 6 (in the vertical direction in the drawing). The optical path length a1 of the cell 8 is about 100 μm, and the optical path length a2 of the cell 10 is about 10 μm. That is, the cell block 2 has two short optical path length cells each having an optical path length of 100 μm or less.

The cell block 2 can be easily produced by using an etching technique. First, a groove having a depth a1 and a groove having a depth a2 are formed on one surface of a quartz substrate 4 by using an etching technique, and then through-holes communicated with the ends of the grooves are formed by drilling or laser processing. Thereafter, a substrate 6 is stacked on one surface side of the substrate 4, and the two substrates 4 and 6 are joined by thermal fusion bonding or the like. As a result, a cell block 2 having two short optical path length cells 8 and 10 different in optical path length therein is completed.

Figure 2:
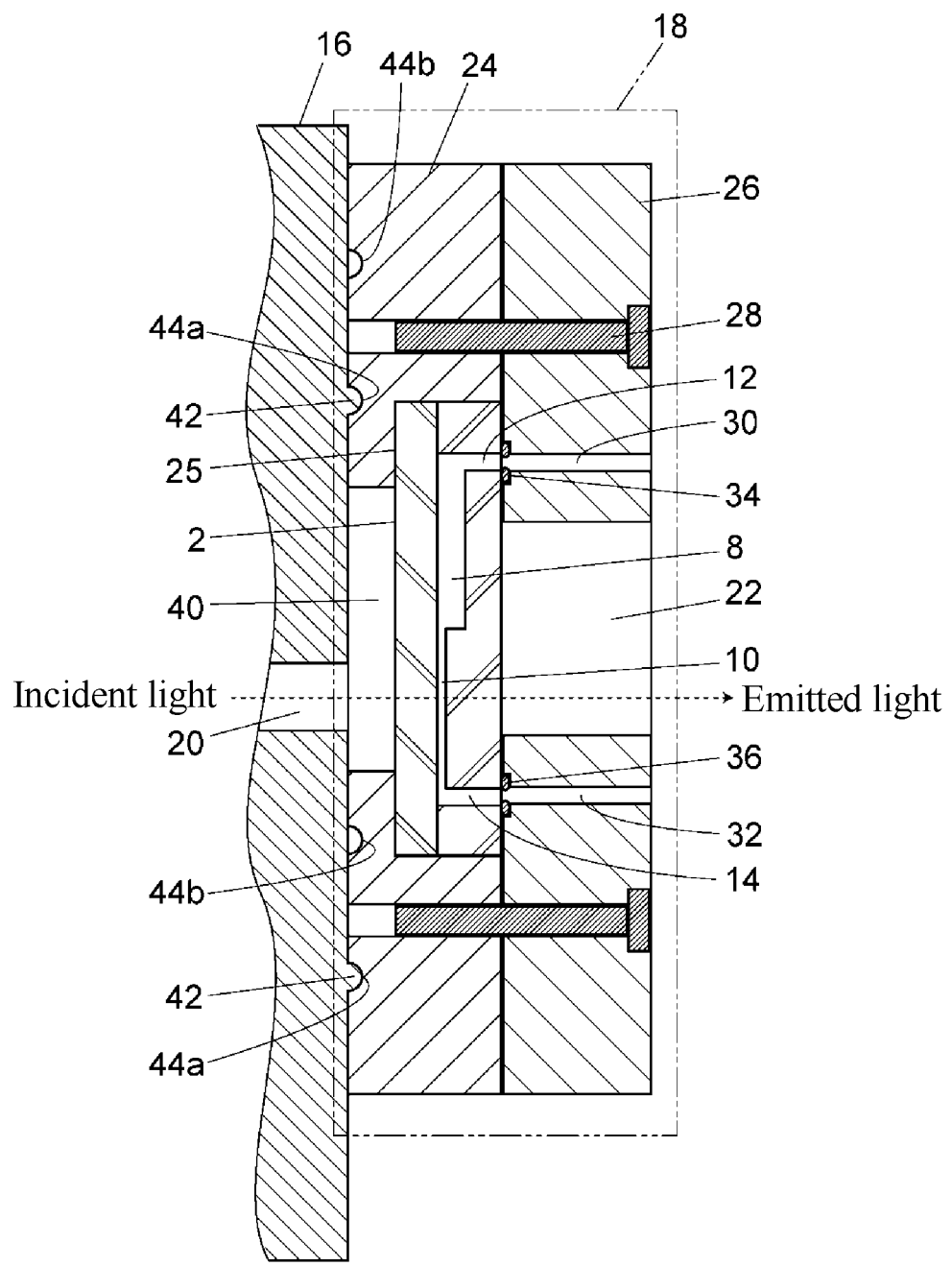
FIG. 2 is a cross-sectional view schematically showing the structure of the flow cell of the embodiment.
Figure 3:
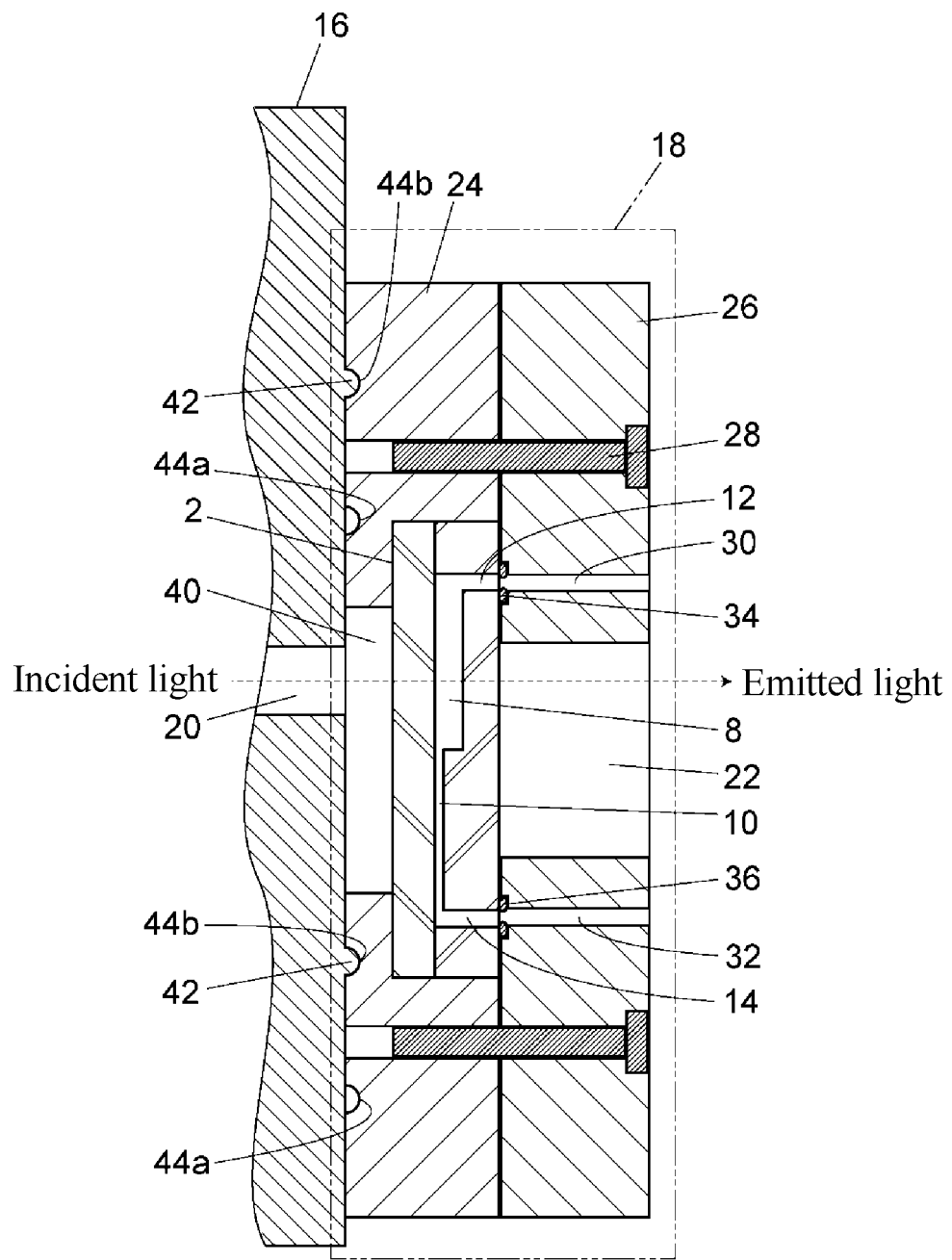
FIG. 3 is a cross-sectional view showing a state in which the position of the cell block is changed in the aforementioned embodiment.
Figure 4:
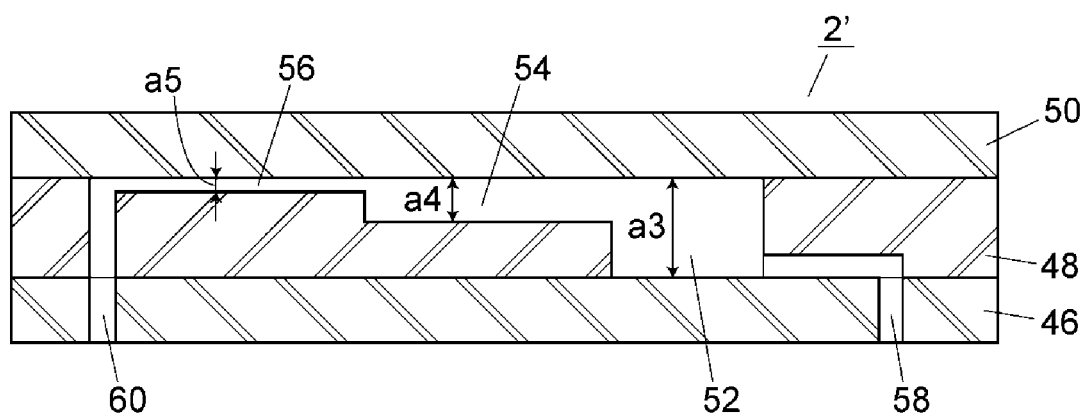
FIG. 4 is a cross-sectional view showing a cell block in a flow cell of another embodiment.

Next, an embodiment of a flow cell using the cell block 2 will be described with reference to FIG. 2 and FIG. 3.

The cell block 2 is accommodated in a cell holder composed of a fixed block 16 and a movable block 18. The movable block 18 is fixed to the fixed block 16 by fastening bolts (not shown). By loosening the bolts, the movable block 18 can be moved relative to the fixed block 16 in the direction parallel to the abutting surface abutting with the fixed block 16 (in the vertical direction in the drawing). The cell block 2 is held by the movable block 18.

The movable block 18 is composed of a first block 24 arranged on the fixed block 16 side and abutting against the fixed block 16 and a second block 26 arranged on the opposite side of the fixed block 16 across the first block 16. A recess 25 for fitting the cell block 2 is provided on the surface of the second block 26 side (the right side in the drawing) of the first block 24, and an opening 40 is provided on the bottom surface of the recess 25.

The cell block 2 is fitted into the recess 25 so that its front surface and rear surface are parallel to the movement direction (vertical direction in the drawing) of the movable block 18 and the surface on which the inlet 12 and outlet 14 are provided is arranged on the second block 26 side. The opening 40 is provided in such a size that the range where the cells 8 and 10 are provided on the back surface of the cell block 2 is exposed to the fixed block 16 side.

The second block 26 is provided with flow paths 30 and 32 respectively communicated with the inlet 12 and the outlet 14 of the cell block 2. The second block 26 is fastened to the first block 24 by fastening the bolts 28 in a state in which O-rings 34 and 36 are sandwiched between the ends of the flow paths 30 and 32 on the cell block 2 side and the inlet 12 and the outlet 14. Although not shown, the flow paths 30 and 32 are communicated with piping connection ports for connecting pipes.

In the fixed block 16, as shown by the broken line arrow in the drawing, an incident window 20 for allowing light to be incident in a direction (left and right direction in the drawing) perpendicular to the front and rear surfaces of the cell block 2 held by the movable block 18 is provided. In the second block 26 of the movable block 18, an emission window 22 for emitting the light incident from the incident window 20 and passed through the cell block 2 is provided.

The mutual abutting surfaces of the fixed block 16 and the first block 24 have an engagement structure for positioning the cell block 2 with respect to the incident window 20. In this embodiment, a protrusion 42 is provided on the fixed block 16 side, and recesses 44*a* and 44*b* for fitting the protrusion 42 are provided on the first block 24 side.

The recess 44*a* defines the position of the cell block 2 for placing the cell 10 on the optical axis of the incident light from the incident window 20. By positioning the movable block 18 so that the protrusion 42 is fitted in the recess 44*a* and fastening the fixed block 16 and the movable block 18 by tightening bolts (not shown), the cell block 2 is positioned so that the incident light passes through the cell 10 (the state of FIG. 2).

Further, the recess 44*a* defines the position of the cell block 2 for placing the cell 8 on the optical axis of the incident light from the incident window 20. By positioning the movable block 18 so that the protrusion 42 is fitted in the recess 44*b* and fastening the fixed block 16 and the movable block 18 by tightening bolts (not shown), the cell block 2 is positioned so that the incident light passes through the cell 8 (the state of FIG. 3).

In this manner, by changing the relative positional relationship between the fixed block 16 and the movable block 18, it becomes possible to change the optical path length of the cell through which the light incident from the incident window 20 passes. Thus, even without changing the flow cell itself, it is possible to change the optical path length according to the concentration of the sample.

Note that the engagement structure for positioning the cell block 2 is not limited to the above, and for example, protrusions 42 may be provided on the first block 24 side, and recesses 44*a* and 44*b* may be provided on the fixed block 15 side.

Next, another embodiment of a flow cell will be described. Since the structure of the cell holder for accommodating the cell block and changing the position of the cell block is basically the same as that of the above-described embodiment, only the structure of the cell block will be described in detail here.

The cell block 2' used for the flow cell of this embodiment is constituted by stacking three light transmitting substrates 46, 48, and 50. The substrates 46, 48 and 50 are, for example, quartz substrates. In the cell block 2', three cells 52, 54 and 56 communicated with each other and having optical path length different from each other are provided. In the same manner as in the cell block 2 of the above-described embodiment, the cell block 2' is used by passing light in a direction (vertical direction in the drawing) perpendicular to the front and rear surfaces of the substrates 46, 48, and 50. The optical path length a3 of the cell 52 is about 1 mm, the optical path length a4 of the cell 54 is about 100 and the optical path length a5 of the cell 56 is about 10 μm.

On the surface of the cell block 2' on the substrate 46 side, an inlet 58 communicated with the end of the cell 52 and an outlet 60 communicated with the end of the cell 56 are provided. A sample flows into the cell block 2' from the inlet 58, flows through the cell 52, the cell 54, and the cell 56 in order, and then flows out from the outlet 60 to the outside of the cell block 2'.

This cell block 2' can be easily produced by using an etching technique in the same manner as in the cell block 2 of the above-described embodiment. In the cell block 2' of this embodiment, the cell 52 is formed by a through-hole provided in the intermediate substrate 48 sandwiched between the substrate 46 and the substrate 50. The cells 54 and 56 are formed by grooves provided on one surface of the substrate 46.

In the flow cell using this cell block 2', by placing any one of the cells 52, 54, and 56 on the optical axis of the incident light from the incident window, the optical path length of light passing through the sample flowing cell can be changed. In particular, in the cell block 2', the cell 52 having a relatively long optical path length which is the same length as the thickness a3 of the substrate 48 is provided in addition to the short optical path length cells 54 and 56 having the optical path length of 100 μm or less. Therefore, the selection range of the optical path length according to the concentration of the sample is wide, and the dynamic range of the detector can be increased.

DESCRIPTION OF REFERENCE SYMBOLS

2, 2' cell block
4, 6, 46, 48, 50 light transmitting substrate
8, 10, 52, 54, 56 cell
12, 58 inlet
14, 60 outlet
16 fixed block
18 movable block
20 incident window
22 emission window
24 first block
26 second block
30, 32 flow path
34, 36 O-ring
40 opening
42 protrusion
44*a*, 44*b* recess

The invention claimed is:

1. A flow cell comprising:
   a light transmitting cell block, wherein the cell block is provided with a plurality of cells communicated with each other and mutually different in optical path length and an inlet and an outlet communicated with the cells and formed on a surface of the cell block, the cell block being formed from a plurality of light transmitting substrates laminated with each other, the plurality of cells being constituted by grooves having different depths from each other and are formed on a surface of a common transmitting substrate of the plurality of light transmitting substrates, the optical path length of each cell being defined by the depth of a respective one of the grooves, and one of the plurality of cells is a short optical path length cell having an optical path length of 100 μm or less; and
   a cell holder configured to accommodate the cell block therein and provided with an incident window for allowing light to enter the cell block and an emission window for emitting the light transmitted through the cell block.

2. The flow cell as recited in claim 1,
   wherein the plurality of cells of the cell block include a long optical path length cell configured by a through-hole provided in an intermediate substrate sandwiched between the plurality of light transmitting substrates.

3. The flow cell as recited in claim 2,
wherein the optical path length of the long optical path length cell is 1 mm or more.

4. The flow cell as recited in claim 1,
wherein the cell holder includes:
a fixed block provided with an incident window and fixed in position; and
a movable block configured to hold the cell block and provided with the emission window, the movable block being fixed to the fixed block in a state in which the cell block is positioned with respect to the incident window so that a desired cell is arranged on an optical axis of the incident light from the incident window.

5. The flow cell as recited in claim 4,
wherein an engagement structure for defining a relative position between the fixed block and the movable block for placing a desired cell on the optical axis of the incident light from the incident window on mutual abutting surfaces of the fixed block and the movable block.

6. The flow cell as recited in claim 4,
wherein the movable block is provided with a flow path therein communicated with the inlet and the outlet of the cell block.

* * * * *

UNITED STATES PATENT AND TRADEMARK OFFICE
CERTIFICATE OF CORRECTION

PATENT NO. : 10,739,249 B1  
APPLICATION NO. : 16/184515  
DATED : August 11, 2020  
INVENTOR(S) : Masahide Gunji Page 1 of 1

It is certified that error appears in the above-identified patent and that said Letters Patent is hereby corrected as shown below:

On the Title Page

Column 1, Item (22), which reads: "Filed: Feb. 4, 2019"  
Should be changed to: --Filed: Nov. 18, 2018--.

Signed and Sealed this  
Thirteenth Day of July, 2021

Drew Hirshfeld  
*Performing the Functions and Duties of the*  
*Under Secretary of Commerce for Intellectual Property and*  
*Director of the United States Patent and Trademark Office*